US012002673B1

(12) United States Patent
Yokomori

(10) Patent No.: US 12,002,673 B1
(45) Date of Patent: Jun. 4, 2024

(54) FLASH IRRADIATION DEVICE AND FLASH DISCHARGE LAMP

(71) Applicant: Ushio Denki Kabushiki Kaisha, Tokyo (JP)

(72) Inventor: Takehiko Yokomori, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/531,054

(22) Filed: Dec. 6, 2023

(30) Foreign Application Priority Data

Dec. 7, 2022 (JP) ................................ 2022-195406

(51) Int. Cl.

| | |
|---|---|
| ***H01J 61/54*** | (2006.01) |
| ***H01J 61/067*** | (2006.01) |
| ***H01J 61/16*** | (2006.01) |
| ***H01J 61/56*** | (2006.01) |
| ***H01J 61/80*** | (2006.01) |

(52) U.S. Cl.
CPC .......... *H01J 61/80* (2013.01); *H01J 61/0672* (2013.01); *H01J 61/16* (2013.01); *H01J 61/54* (2013.01); *H01J 61/56* (2013.01)

(58) Field of Classification Search
CPC ................................ H01J 61/547; H01J 61/80
USPC .......................................................... 313/567
See application file for complete search history.

(56) References Cited

U.S. PATENT DOCUMENTS

| | | | | |
|---|---|---|---|---|
| 6,617,804 | B2 * | 9/2003 | Machida | H01T 4/12 361/120 |
| 2003/0122489 | A1 * | 7/2003 | Mizoziri | H01J 61/90 313/616 |
| 2007/0229657 | A1 | 10/2007 | Kusuda | |
| 2021/0265156 | A1 * | 8/2021 | Kihara | H01J 61/16 |

FOREIGN PATENT DOCUMENTS

| | | | |
|---|---|---|---|
| JP | 2007-266351 | A | 10/2007 |

* cited by examiner

*Primary Examiner* — Christopher M Raabe
(74) *Attorney, Agent, or Firm* — Studebaker & Brackett PC

(57) ABSTRACT

A flash irradiation device includes: a light-emitting tube sealing a light-emitting gas inside; a pair of discharging electrodes being arranged distant from each other in the first direction; a reflecting member that is disposed on an opposite side of the light-emitting tube from the workpiece; a pair of trigger electrodes on an outer wall surface of the light-emitting tube or in a vicinity of the light-emitting tube, the pair of the trigger electrodes being arranged distant from each other in the first direction; a lighting circuit connected to the pair of the discharging electrodes, the lighting circuit being configured to supply electric power between the pair of the discharging electrodes; and a trigger circuit connected to the pair of the trigger electrodes, the trigger circuit configured to apply a voltage for starting lighting across the pair of the trigger electrodes.

8 Claims, 8 Drawing Sheets

FLASH IRRADIATION DEVICE AND FLASH DISCHARGE LAMP

BACKGROUND OF THE INVENTION

Field of the Invention

The present invention relates to a flash irradiation device and a flash discharge lamp.

Description of the Related Art

Conventionally, flash irradiation devices have been used for heat treatment of semiconductor substrates and heat treatment in production processes in printable electronics and other fields. In particular, in recent years, due to increasingly finer patterns printed in semiconductor processes, a method of instantaneous heat treatment by a flash irradiation device has been attracting attention as a method for activating injected impurities while suppressing the spread of the injected impurities caused by heating for a long time.

Lighting control is executed on a flash discharge lamp (also referred to as a "flash lamp") that suits a device for heat treatment of semiconductor wafers to enable the flash discharge lamp to instantaneously generate high-output light and heat a semiconductor wafer. A known method for controlling timing with which the flash discharge lamp starts lighting includes applying a trigger-purpose voltage to a wire-shaped electrode disposed adjacent to a light-emitting tube in a state in which a voltage is applied across discharging electrodes and thereby inducing a dielectric breakdown to invite lighting (for example, refer to Patent Document 1 below).

PRIOR ART DOCUMENT

Patent Document

Patent Document 1: JP-A-2007-266351

SUMMARY OF THE INVENTION

With the progress of technology for semiconductor processes these days, the development of further finer patterns is pursued and the flash irradiation device is required to further reduce irradiation time and increase light output. Hence, the inventor of the present invention has extensively studied on a way of increasing light output from the flash irradiation device and found the existence of the following problem.

Against the backdrop above, recent flash irradiation devices are required to generate increased light output, and to attain increased light output, a method has been considered that includes supplying a current of the order of several kiloamperes to a discharge lamp mounted in a flash irradiation device to light the discharge lamp.

Unfortunately, an attempt to use a configuration in which a current of several kiloamperes flows to the discharge lamp is likely to cause lifetime of a light-emitting tube of the discharge lamp to be shortened. This is because a current at the time of light emission comes into contact with the light-emitting tube and thus a material (e.g., quartz glass) that makes up the light-emitting tube is apt to change in quality early. As a result, although demand for increased light output is growing, it is practically difficult to simply supply a current of several kiloamperes, as described above, to the discharge lamp mounted in the flash irradiation device particularly from the viewpoint of durability and reliability.

In view of the above problem, it is an object of the present invention to provide a flash irradiation device and a flash discharge lamp that are designed to irradiate a workpiece with light at an increased level of irradiation energy without complicating device configuration and a lighting circuit.

A flash irradiation device according to the present invention is a flash irradiation device configured to irradiate a workpiece with light. The flash irradiation device includes:

- a light-emitting tube extending in a first direction and sealing a light-emitting gas inside;
- a pair of discharging electrodes inside the light-emitting tube, the pair of the discharging electrodes being arranged distant from each other in the first direction;
- a reflecting member that is disposed on an opposite side of the light-emitting tube from the workpiece such that light emitted from the light-emitting tube in a direction opposite the workpiece is reflected off the reflecting member toward the workpiece;
- a pair of trigger electrodes on an outer wall surface of the light-emitting tube or in a vicinity of the light-emitting tube, the pair of the trigger electrodes being arranged distant from each other in the first direction;
- a lighting circuit connected to the pair of the discharging electrodes, the lighting circuit being configured to supply electric power between the pair of the discharging electrodes; and
- a trigger circuit connected to the pair of the trigger electrodes, the trigger circuit configured to apply a voltage for starting lighting across the pair of the trigger electrodes.

The term "in a vicinity of a light-emitting tube" used herein is intended to refer to a state in which a trigger electrode is disposed in a range of distance less than or equal to 2 mm from a wall surface of the light-emitting tube.

In the conventional flash irradiation device, as described in Patent Document 1 above, a single trigger electrode is mounted on an outer wall surface of a light-emitting tube or in a vicinity of the light-emitting tube along a tube axis of the light-emitting tube so as to extend over a pair of discharging electrodes in a first direction.

The trigger electrode is an electrode for starting lighting that causes a predetermined voltage for starting lighting (hereinafter also referred to as a "trigger voltage") to be applied between the trigger electrode and one of the discharging electrodes to induce a dielectric breakdown between the pair of the discharging electrodes and generate a flash in the light-emitting tube. Before the trigger voltage is applied, the trigger electrode is maintained at a predetermined electric potential to suppress the generation of an unintended electrical discharge between the pair of the discharging electrodes.

The trigger electrode is a substantially essential component in the flash irradiation device from the viewpoint of electrical discharge control and is an important member to achieve lighting at an increased level of electric power and lighting for a shortened length of time. However, the trigger electrode is made of a conductor (specifically, tungsten (W), molybdenum (Mo), or the like) from the viewpoint of controlling an electric potential state inside the light-emitting tube through application of a voltage.

The conductor is generally a metal or a similar material and hardly displays transparency to light. Hence, in the conventionally configured flash irradiation device, light radiated to the trigger electrode out of light emitted from the light-emitting tube is mostly absorbed into the trigger electrode without traveling toward a reflecting member or a workpiece.

Light radiated to the trigger electrode includes light being emitted from the light-emitting tube and directly traveling toward the trigger electrode as well as light being reflected off the reflecting member. Thus, of a total of the light emitted from the light-emitting tube, an amount of the light radiated to the trigger electrode is by no means small.

Therefore, in the flash irradiation device configured as described above, light emitted from the light-emitting tube is less apt to be blocked by the trigger electrodes and readily reaches the reflecting member and the workpiece. As a result, the flash irradiation device configured as described above suppresses a loss of energy of the light emitted from the light-emitting tube and is thus able to irradiate the workpiece with the light at an increased level of irradiation energy compared with the conventional flash irradiation device.

The flash irradiation device may include a tubular body inside which a discharge gas including an element of group 18 is sealed and ends of the pair of the trigger electrodes facing each other in the first direction are sealed, the tubular body displaying transparency to light emitted from the light-emitting tube.

The "ends of the pair of the trigger electrodes facing each other in the first direction are sealed" described herein refers to a state in which facing sides of the pair of the trigger electrodes disposed next to the light-emitting tube are disposed inside the tubular body while other ends are structured so as to stick out of the tubular body. In other words, the condition refers to a state in which the tubular body and the trigger electrodes are joined together such that airtightness is maintained, i.e., a state in which if the tubular body is made up of a glass tube, the ends of the trigger electrodes and the glass tube are fused together.

Further, in the flash irradiation device, an encapsulated pressure of the discharge gas sealed in the tubular body may be lower than atmospheric pressure.

The configuration described above inhibits the trigger electrodes from reacting with oxygen present in a surrounding area and being oxidized by being irradiated with light emitted from the light-emitting tube. In other words, use of the configuration above leads to an increase in lifetime of the flash irradiation device.

When the encapsulated pressure of the discharge gas sealed in the tubular body is lower than atmospheric pressure, which is, in other words, a negative pressure, an electrical discharge is apt to be generated between the trigger electrodes. This helps to control the start of lighting by the light-emitting tube.

In the flash irradiation device, respective ends of the pair of the trigger electrodes may be positioned outside a region put between the pair of the discharging electrodes in the first direction.

A region where light is primarily generated inside the light-emitting tube is a space put between the pair of the discharging electrodes. Thus, with the configuration described above, light emitted from the light-emitting tube mostly reaches the reflecting member and then the workpiece without being blocked by the trigger electrodes.

The flash irradiation device may include:

an observation hole formed in the reflecting member to allow radiation radiated from the workpiece to pass through the observation hole; and a light-receiving element disposed on an opposite side of the reflecting member from the workpiece, the light-receiving element being configured to receive the radiation passing through the observation hole and output a signal based on intensity of the received radiation, in which the observation hole and the light-receiving element are disposed between the pair of the trigger electrodes in the first direction.

In the flash irradiation device, the light-receiving element may be an element such that a wavelength band in which the element displays light reception sensitivity belongs to a range less than or equal to 4 m.

The term "display light reception sensitivity" as used herein refers to being capable of detecting temperatures greater than or equal to 25° C. (room temperature) by receiving light in a predetermined wavelength band.

The configuration described above enables observation of light radiated from the workpiece by the light-receiving element without being blocked by the trigger electrodes and enables monitoring of changes in temperature of the workpiece being irradiated with a flash.

Glass (particularly, quartz glass), which is generally used as a material for the light-emitting tube from the viewpoint of heat resistance and transparency to light, is less apt to transmit light having a wavelength of 4 m or more. Thus, in consideration of such an optical characteristic, it is preferable that the wavelength band in which the light-receiving element displays light reception sensitivity belongs to a range less than or equal to 4 m.

In particular, since the light-emitting tube and the tubular body that are made of quartz glass hardly transmit light having a wavelength of 160 nm or less, it is more preferable that the wavelength band in which the light-receiving element displays light reception sensitivity belongs to a range more than or equal to 160 nm. Further, when the suppression of interference with light emitted from the light-emitting tube and the capability of measuring from low temperatures are also taken into consideration, it is particularly preferable that the wavelength band in which the light-receiving element displays light reception sensitivity belongs to a range from 3 μm to 4 μm inclusive.

In the flash irradiation device, the trigger electrodes may be disposed between the light-emitting tube and the reflecting member.

The trigger electrodes may be disposed on a side of the light-emitting tube remote from the reflecting member. However, the trigger electrodes are preferably between the light-emitting tube and the reflecting member when a loss of energy of the light being emitted from the light-emitting tube and directly traveling toward the workpiece is taken into consideration.

A flash discharge lamp according to the present invention includes:

a light-emitting tube extending in a first direction and sealing a light-emitting gas inside;

a pair of discharging electrodes inside the light-emitting tube, the pair of the discharging electrodes being arranged distant from each other in the first direction; and a pair of trigger electrodes on an outer wall surface of the light-emitting tube or in a vicinity of the light-emitting tube, the pair of the trigger electrodes being arranged distant from each other in the first direction.

The technique according to the present invention makes it possible to realize a flash irradiation device and a flash discharge lamp that are designed to irradiate a workpiece with light at an increased level of irradiation energy without complicating device configuration and a lighting circuit.

DETAILED DESCRIPTION OF THE PREFERRED EMBODIMENTS

A flash irradiation device and a flash discharge lamp according to the present invention will be described hereinafter with reference to the drawings. It is to be noted that all the drawings are schematically shown, and the number of components in each of the drawings is not always the same as the actual number.

[Device Configuration]

Figure 1:
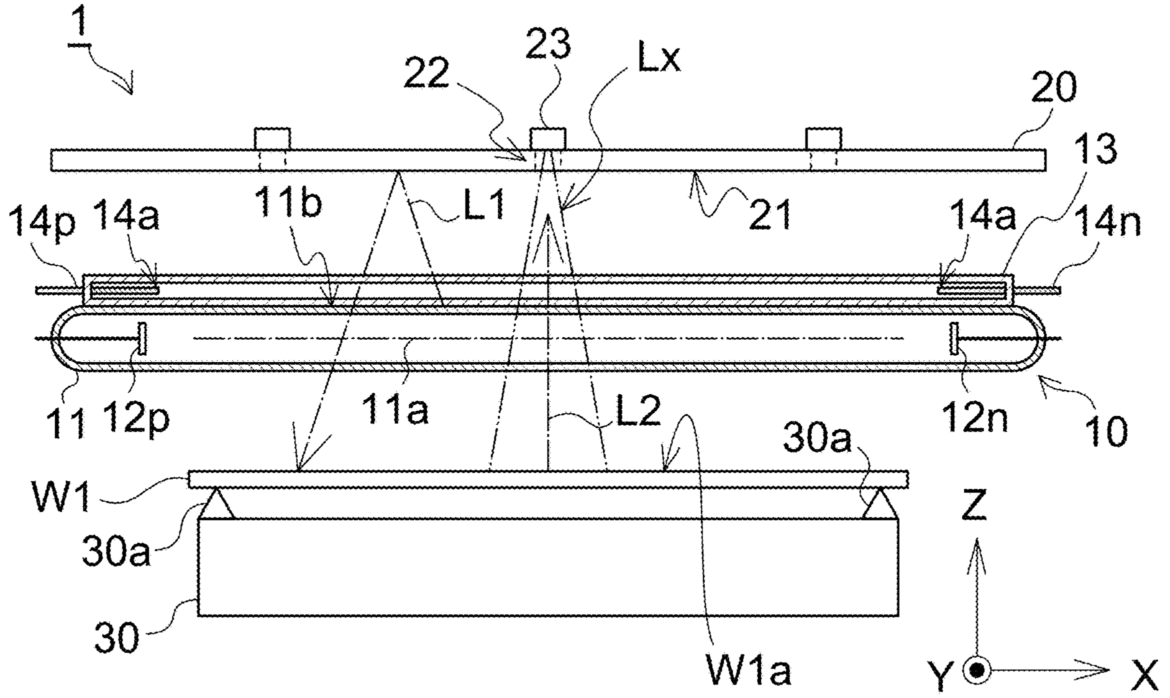
FIG. 1 is a schematic view of an embodiment of a flash irradiation device, viewed along a Y direction.
Figure 2:
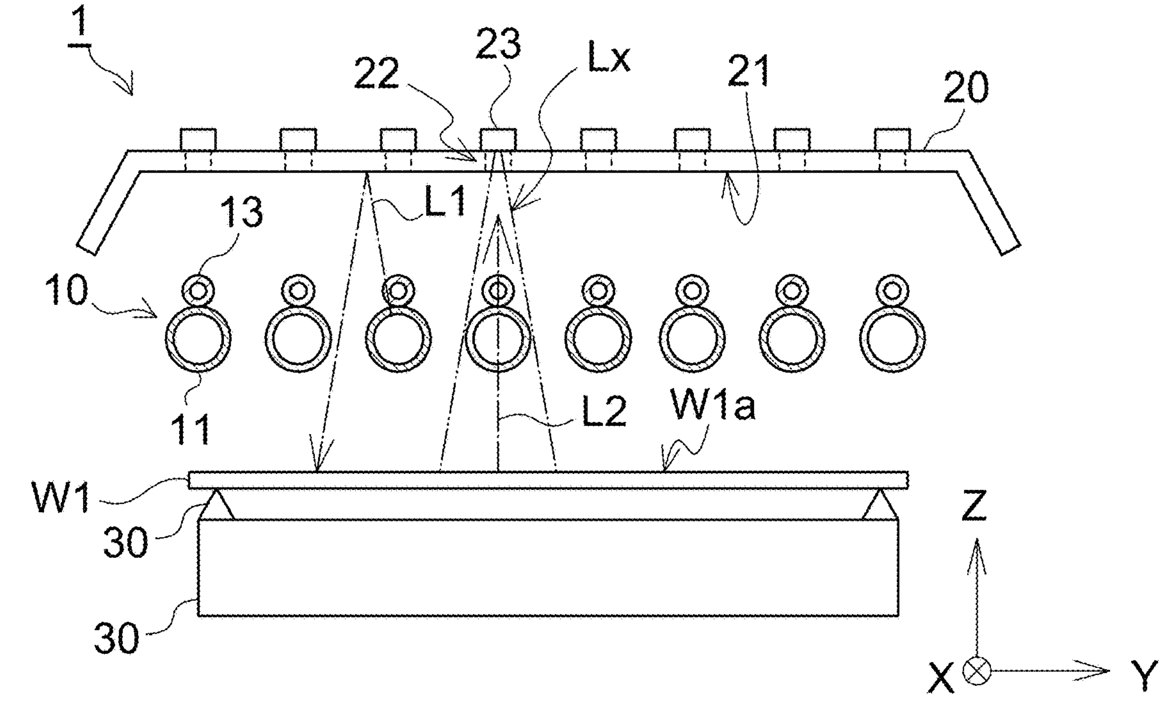
FIG. 2 is a drawing of the flash irradiation device of FIG. 1, viewed along an X direction.

FIG. 1 is a schematic view of an embodiment of a flash irradiation device 1, viewed along a Y direction. FIG. 2 is a drawing of the flash irradiation device 1 of FIG. 1, viewed along an X direction. As shown in FIGS. 1 and 2, the flash irradiation device 1 of the present embodiment includes a plurality of flash discharge lamps 10, a reflecting member 20, and a support base 30 on which a workpiece W1 is placed. The plurality of the flash discharge lamps 10 each include a light-emitting tube 11, a pair of discharging electrodes (12*p*, 12*n*), a tubular body 13, and a pair of trigger electrodes (14*p*, 14*n*). Although the flash irradiation device 1 of the present embodiment includes the plurality of the flash discharge lamps 10, there may be a configuration in which only one flash discharge lamp 10 is mounted depending on a type, a size or another property of the workpiece W1.

The description given hereinafter is provided on condition that a direction along a tube axis 11*a* of the light-emitting tube 11 is an X direction as shown in FIG. 1, a direction in which the flash discharge lamps 10 are arranged is a Y direction as shown in FIG. 2, and a direction in which the flash discharge lamps 10 and the workpiece W1 face each other is a Z direction. The X direction corresponds to a first direction.

As described above, when it is necessary to make a distinction between positive or negative to express a direction herein, the direction is described with a positive or negative sign, such as "+Z direction" or "−Z direction". When it is not necessary to make a distinction between positive or negative to express a direction, the direction is simply described as the "Z direction".

The light-emitting tube 11, in which a light-emitting gas is sealed, is a quartz glass-made member that has a linear tube shape and includes the pair of the discharging electrodes (12*p*, 12*n*) inside, which are arranged distant from each other in the X direction. In the present embodiment, the light-emitting tube 11 is 400 mm long in the X direction and has an outside diameter of 13 mm when viewed along the X direction.

As shown in FIG. 1, the pair of the discharging electrodes (12*p*, 12*n*) are arranged at a distance from each other that is greater than a width of the workpiece W1 in the X direction and is configured such that a light-emitting region of the light-emitting tube 11 is larger than the width of the workpiece W1. Specifically, in the present embodiment, whereas the width in the X direction of the workpiece W1 is 300 mm, the distance between the pair of the discharging electrodes (12*p*, 12*n*) in the X direction is set to 500 mm.

The support base 30 is a pedestal equipped with a plurality of pins 30*a* on which the workpiece W1 is placed. A configuration of the support base 30 that supports the workpiece W1, shown in FIGS. 1 and 2, is simply an example and may be altered to another configuration in which an outer edge of the workpiece W1 is hooked and thereby supported, for example, with proviso that the configuration enables the workpiece W1 to be fixed at a predetermined position. A distance between the flash discharge lamps 10 and the workpiece W1 in the Z direction is 30 mm in the present embodiment, although the distance can be appropriately adjusted in response to a condition such as the type of the workpiece W1 and a treatment process.

As shown in FIG. 1, the tubular body 13, inside which ends (14*a*, 14*a*) of the pair of the trigger electrodes (14*p*, 14*n*) facing each other in the X direction are sealed, is disposed on an outer wall surface on a +Z side of the light-emitting tube 11. A discharge gas that includes an element of group 18 is also sealed inside the tubular body 13 at an encapsulated pressure lower than atmospheric pressure. A position at which the tubular body 13 and the pair of the trigger electrodes (14*p*, 14*n*) are disposed may be on a −Z side of the light-emitting tube 11. However, the position is preferably on the +Z side of the light-emitting tube 11 when a loss of energy of light L1 being emitted from the light-emitting tube 11 and directly traveling toward the workpiece W1 is taken into consideration.

In the present embodiment, in the same way as the light-emitting tube 11, the tubular body 13 is made of quartz glass and is integrated with the light-emitting tube 11. However, the light-emitting tube 11 and the tubular body 13 may be made of different materials and may not be in contact with each other.

The tubular body 13 is fixed onto an outer wall surface 11*b* of the light-emitting tube 11 and the trigger electrodes (14*p*, 14*n*) are thereby fixed at a position distant 2 mm from the light-emitting tube 11. The flash irradiation device 1 may not include the tubular body 13, and the trigger electrodes (14*p*, 14*n*) may be exposed and disposed on the outer wall surface 11*b* of the light-emitting tube 11 or in a vicinity of the light-emitting tube 11.

In the present embodiment, the trigger electrodes (14*p*, 14*n*) are a wire-shaped member made of a material that is tungsten (W). The trigger electrodes (14*p*, 14*n*) are fixed such that the respective ends (14*a*, 14*a*) are positioned outside the workpiece W1 in the X direction. The trigger electrodes (14*p*, 14*n*) may be made of a material, such as molybdenum (Mo), other than tungsten (W) and may also have a rod shape or a plate shape.

In the present embodiment, a reflective film made of nickel (Ni), a material that offers a high melting point, is formed on a surface of the trigger electrodes (14*p*, 14*n*) to help the light L1 generated inside the light-emitting tube 11 to travel toward the workpiece W1. The material that forms the reflective film may be another material, such as rhodium (Rh), other than nickel (Ni). Whether or not the reflective film is disposed is chosen freely.

The reflecting member 20 includes a reflecting surface 21 to cause the light L1 emitted from the flash discharge lamps 10 to be reflected off, and as shown in FIG. 1, the reflecting surface is disposed such that the light L1 being emitted from the flash discharge lamps 10 and traveling to the +Z side is reflected off to the −Z side. A size, a shape, and other properties of the reflecting member 20 shown in FIGS. 1 and 2 are simply an example.

As shown in FIGS. 1 and 2, the reflecting member 20 has an observation hole 22 (not actually seen and so indicated by broken lines in FIG. 1) through which radiation L2 radiated from the workpiece W1 is allowed to pass and be received by a light-receiving element 23 disposed on a wall surface on the +Z side of the reflecting member 20. The observation hole 22 and the light-receiving element 23 are disposed inside a region put between the pair of the trigger electrodes (14*p*, 14*n*) in the X direction.

The reflecting member 20 is, for example, an aluminum (Al) plate.

The light-receiving element 23 receives the radiation L2 radiated from the workpiece W1 and outputs a signal based on the radiation L2 to a signal processor (not shown). The signal is used for measuring temperature at a surface of the workpiece W1 and recording heat history.

In the present embodiment, the light-receiving element 23 is preferably a thermopile-based power meter or a similar sensor whose light reception characteristic is flat from 0.2 μm to 20 μm, a wavelength band in which the power meter displays light reception sensitivity. The wavelength band in which the light-receiving element 23 displays light reception sensitivity can be freely and appropriately selected depending on a transmission spectrum of a material that the light-emitting tube 11 and the tubular body 13 are made of By being used in combination with a bandpass filter or the like that transmits only specified wavelengths, the light-receiving element is able to measure light output in a desired wavelength band. As described above, in consideration of a transmission spectrum of quartz glass and to avoid interference with the light L1 emitted from the light-emitting tube 11, it is preferable that the wavelength band in which the light-receiving element 23 displays light reception sensitivity belongs to a range less than or equal to 4 μm. When the capability of measuring from low temperatures is also taken into consideration, it is more preferable that the wavelength band belongs to a range from 3 μm to 4 μm inclusive.

The light-receiving element 23 may be fixed at a position separated from the reflecting member 20, and any number of the light-receiving elements 23 may be mounted in the flash irradiation device. In the present embodiment described herein, the light-receiving element 23 is an element that receives the radiation L2 radiated from the workpiece W1. However, the light-receiving element 23 may be an element that measures temperature of the light-emitting tube 11, which is a component of the flash discharge lamp 10.

[Lighting Operation]

Figure 3:
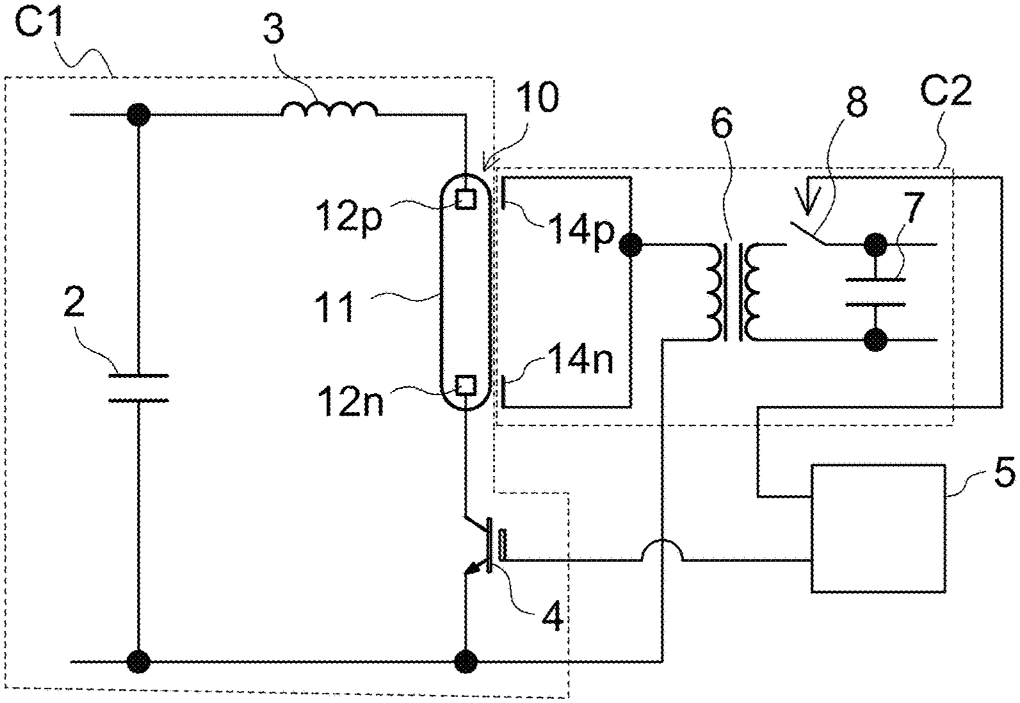
FIG. 3 is a circuit diagram showing an example of a configuration of a lighting circuit and a trigger circuit for a flash discharge lamp.

Lighting operation of the flash discharge lamps 10 will now be described with reference to the drawings. FIG. 3 is a circuit diagram showing an example of a configuration of a lighting circuit and a trigger circuit for lighting the flash discharge lamp 10. As shown in FIG. 3, the discharging electrodes (12*p*, 12*n*) of the flash discharge lamp 10 are connected to a lighting circuit C1 that includes a discharge capacitor 2, an inductor 3, and a first switching element 4.

The trigger electrodes (14*p*, 14*n*) of the flash discharge lamp 10 are connected to a trigger circuit C2 for starting lighting that includes a transformer 6, a trigger capacitor 7, and a second switching element 8.

Further, the first switching element 4 and the second switching element 8 are connected to a controller 5 that performs ON/OFF control on each of the switching elements. The lighting circuit C1 and the trigger circuit C2 shown in FIG. 3 are simply an example. Another configuration may be used with proviso that the configuration through control of the controller 5 enables the supply of electric power for lighting the flash discharge lamp 10 and the supply of electric power for generating an electrical discharge between the trigger electrodes to start discharging.

The controller 5 is connected to the first switching element 4 and the second switching element 8 and controls an ON/OFF state of each of the switching elements (4,8) independently. The controller 5 that may be used is an application-specific integrated circuit (ASIC) specifically designed, a field-programmable gate array (FPGA) specifically programmed, or an arithmetic processing device such as a central processing unit (CPU) or a microprocessor unit (MPU), for example.

At the time of voltage application, a voltage is applied across the pair of the discharging electrodes (12*p*, 12*n*) included in the flash discharge lamp 10 such that the discharging electrode 12*p* is at a high potential with respect to the discharging electrode 12*n*. At the start of operation, a voltage is applied across the pair of the trigger electrodes (14*p*, 14*n*) such that the trigger electrodes (14*p*, 14*n*) are at a high potential relative to the discharging electrodes 12. The trigger electrodes 14*p* and 14*n* are at a potential shared with each other.

Although a power supply circuit (e.g., a DC-DC converter) is connected to an upstream side of the discharge capacitor 2 to charge the discharge capacitor 2, a description of the power supply circuit is omitted for the convenience of focusing on the description of lighting operation. The operation after the flash irradiation device is put into a state in which charging the discharge capacitor 2 is completed will be described below. Similarly, the operation after the flash irradiation device is put into a state in which charging the trigger capacitor 7 is completed will be described below.

First, in a state in which the discharge capacitor 2 has been charged, the first switching element 4 and the second switching element 8 are in the OFF state under control of the controller 5.

When lighting control starts, the controller 5 switches the first switching element 4 from the OFF state to the ON state. At this point in time, a voltage according to an amount of an electric charge stored in the discharge capacitor 2 is applied across the discharging electrodes (12*p*, 12*n*) of the flash discharge lamp 10, but an electrical discharge is not generated inside the light-emitting tube 11.

After switching the first switching element 4 from the OFF state to the ON state, the controller 5 switches the second switching element 8 from the OFF state to the ON state. As a result, an electric charge stored in the trigger capacitor 7 is discharged to a primary coil of the transformer 6 and an electromotive force is generated in a secondary coil of the transformer 6.

Due to the generation of the electromotive force, a pulse voltage is applied across the pair of the trigger electrodes (14*p*, 14*n*) to generate an electrical discharge. Then, when the pulse voltage is applied across the trigger electrodes (14*p*, 14*n*), part of the light-emitting gas sealed in the light-emitting tube 11 is ionized and a dielectric breakdown is induced between the discharging electrodes (12*p*, 12*n*). Then, an electrical discharge generated by the dielectric breakdown between the discharging electrodes (12*p*, 12*n*) causes instantaneous light emission to occur inside the light-emitting tube 11.

Verification experiments were conducted to verify how a distribution of irradiation energy on a principal surface W1*a* of the workpiece W1 changes by a difference in the configuration of the flash discharge lamp. Details of the verification experiments will be described below.

Example 1

Figure 4A:
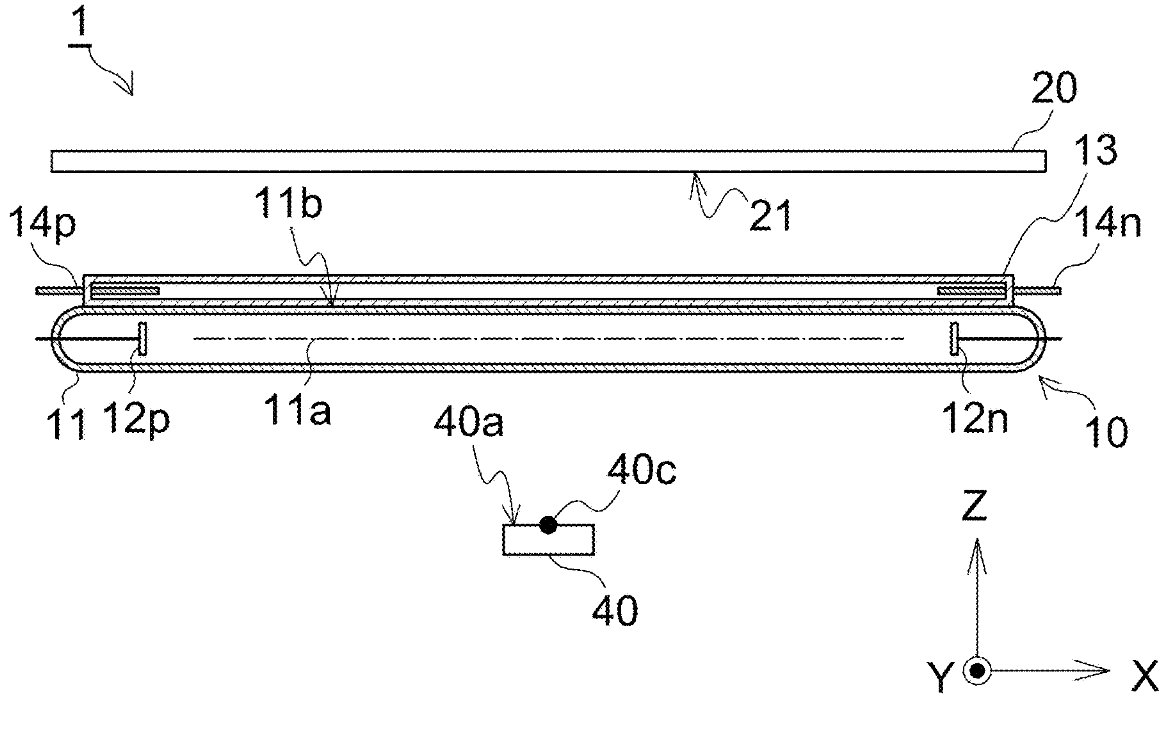
FIG. 4A is a schematic view showing a configuration of Example 1 in a verification experiment, viewed along the Y direction.

FIG. 4A is a schematic view showing a configuration of Example 1 in a verification experiment, viewed along the Y direction. As shown in FIG. 4A, a flash irradiation device 1 in Example 1 is equivalent to the flash irradiation device 1 configured as described above except that the observation hole 22 and the light-receiving element 23 are not included in Example 1. In this verification experiment, a calorimeter 40 was disposed at a place where the workpiece was disposed, as shown in FIG. 4A, to measure irradiation energy of the light L1 radiated to the workpiece.

Example 2

Figure 4B:
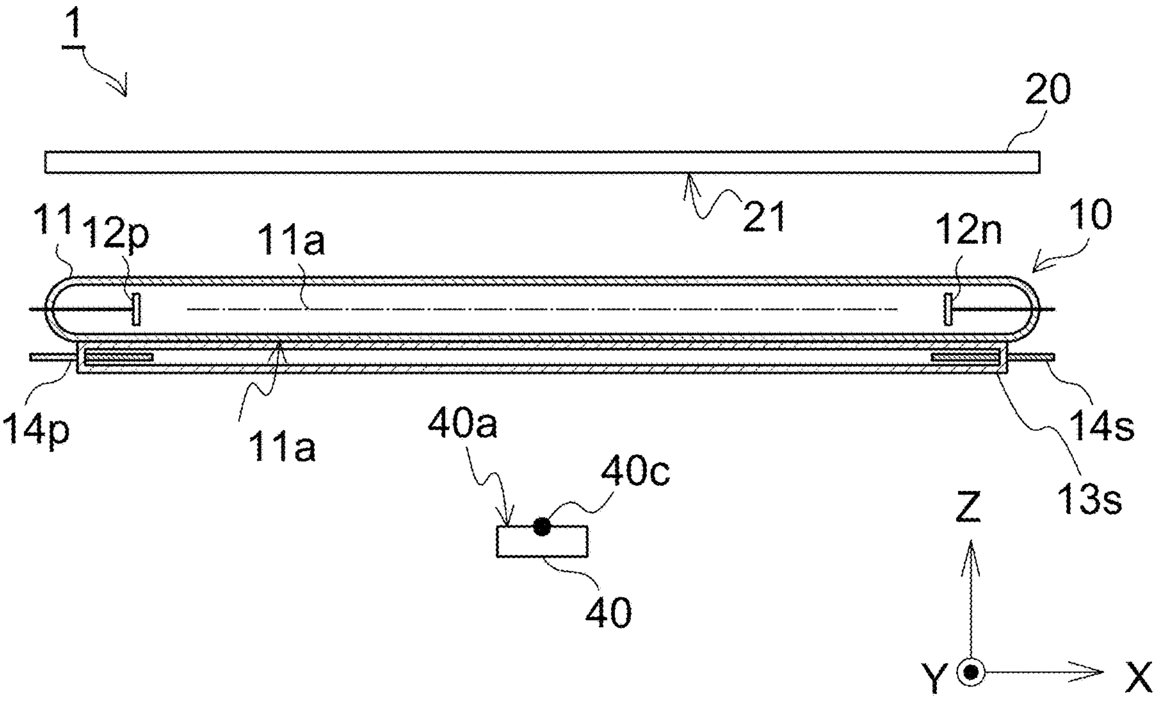
FIG. 4B is a schematic view showing a configuration of Example 2 in a verification experiment, viewed along the Y direction.

FIG. 4B is a schematic view showing a configuration of Example 2 in a verification experiment, viewed along the Y direction. As shown in FIG. 4B, Example 2 is similar to Example 1 except that the tubular body 13 is disposed on the −Z side of the light-emitting tube 11 in Example 2.

Comparative Example 1

Figure 4C:
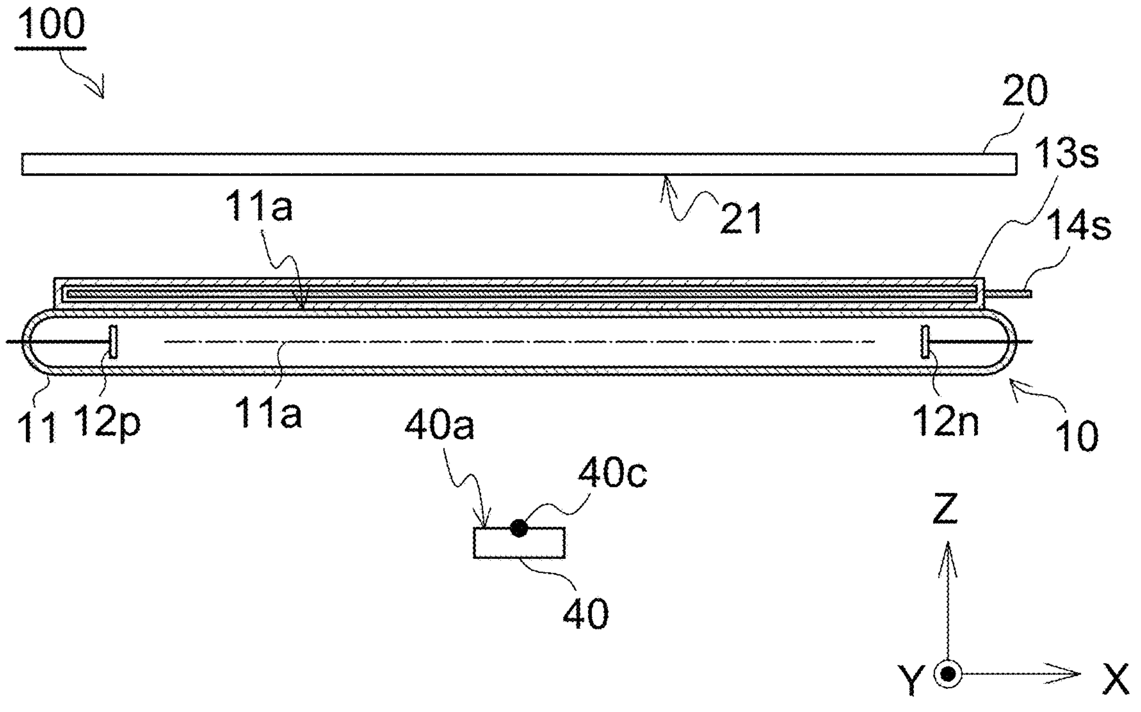
FIG. 4C is a schematic view showing a configuration of Comparative Example 1 in a verification experiment, viewed along the Y direction.

FIG. 4C is a schematic view showing a configuration of Comparative Example 1 in a verification experiment, viewed along the Y direction. In the following description of comparative examples, parts shared with the flash irradiation device 1 in the examples are denoted by the same numerals or symbols assigned to the flash irradiation device 1 in the examples, with a view to facilitating comprehension of the configuration. As shown in FIG. 4C, Comparative Example 1 is similar to Example 1 except for a conventional configuration of a trigger electrode 14*s* that is disposed so as to extend over the pair of the discharging electrodes (12*p*, 12*n*) in the X direction and a tubular body 13*s* that seals the trigger electrode 14*s* inside.

Comparative Example 2

Figure 4D:
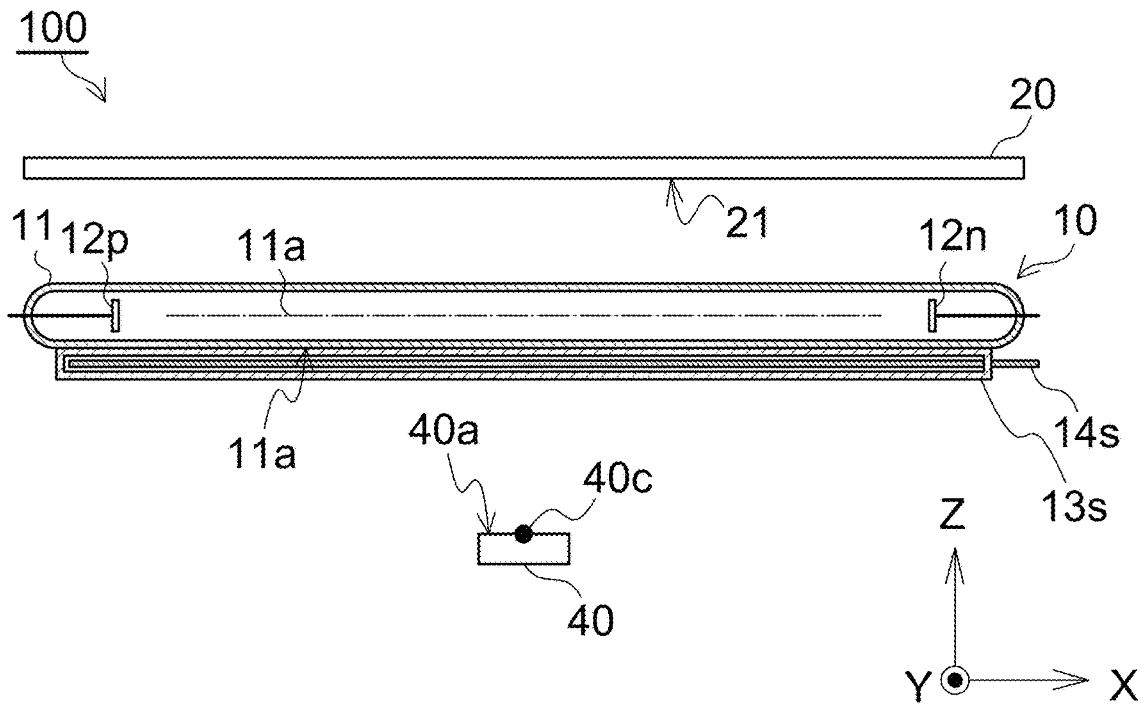
FIG. 4D is a schematic view showing a configuration of Comparative Example 2 in a verification experiment, viewed along the Y direction.

FIG. 4D is a schematic view showing a configuration of Comparative Example 2 in a verification experiment, viewed along the Y direction. As shown in FIG. 4D, Comparative Example 2 is similar to Example 2 except for a conventional configuration of a trigger electrode 14*s* that is disposed so as to extend over the pair of the discharging electrodes (12*p*, 12*n*) in the X direction and a tubular body 13*s* that seals the trigger electrode 14*s* inside.

(Conditions)

The verification experiments were conducted on a case in which only one flash discharge lamp 10 is mounted and a case in which 30 flash discharge lamps 10 are mounted to verify a distribution of irradiation energy produced by a single flash discharge lamp 10 and a distribution of irradiation energy of the light L1 radiated to the workpiece in the flash irradiation device 1.

The calorimeter 40 was disposed, as shown in FIG. 4A, such that a center 40*c* of a light receiving part 40*a* faced the tube axis 11*a* of the light-emitting tube 11 in the Z direction. Measurement was performed by moving the calorimeter in the Y direction. In the case in which the 30 flash discharge lamps 10 were mounted, the calorimeter 40 was disposed such that the 16th flash discharge lamp 10 in the order from the −Y side of the flash discharge lamps 10 arranged in the Y direction faced the center 40*c* of the light receiving part 40*a* of the calorimeter 40, and measurement was performed.

The calorimeter 40 used was the Ophir Optronics-made L30A. With the distance between the light-emitting tube 11 and the light receiving part 40*a* of the calorimeter 40 set to each of 30 mm, 60 mm, and 100 mm, distributions of irradiation energy were measured for the respective distances.

A capacitance value of the discharge capacitor 2 was 400 μF, and a voltage applied across the pair of the discharging electrodes (12*p*, 12*n*) immediately before a start of operation was 2.7 kV. As a result, energy of 1458 J was put into each flash discharge lamp 10, and the light L1 according to the energy was emitted.

(Results)

Figure 5A:
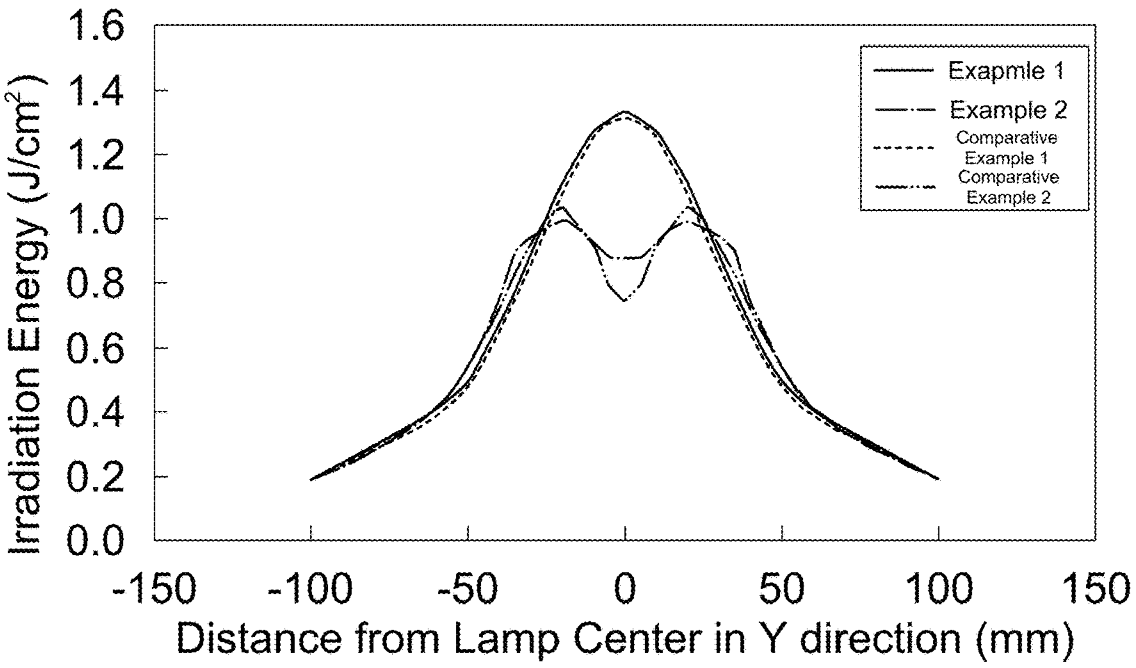
FIG. 5A is a graph showing a distribution of irradiation energy when a verification experiment in which one flash discharge lamp is mounted and a light-emitting tube and a calorimeter are distant 30 mm from each other is conducted.
Figure 5B:
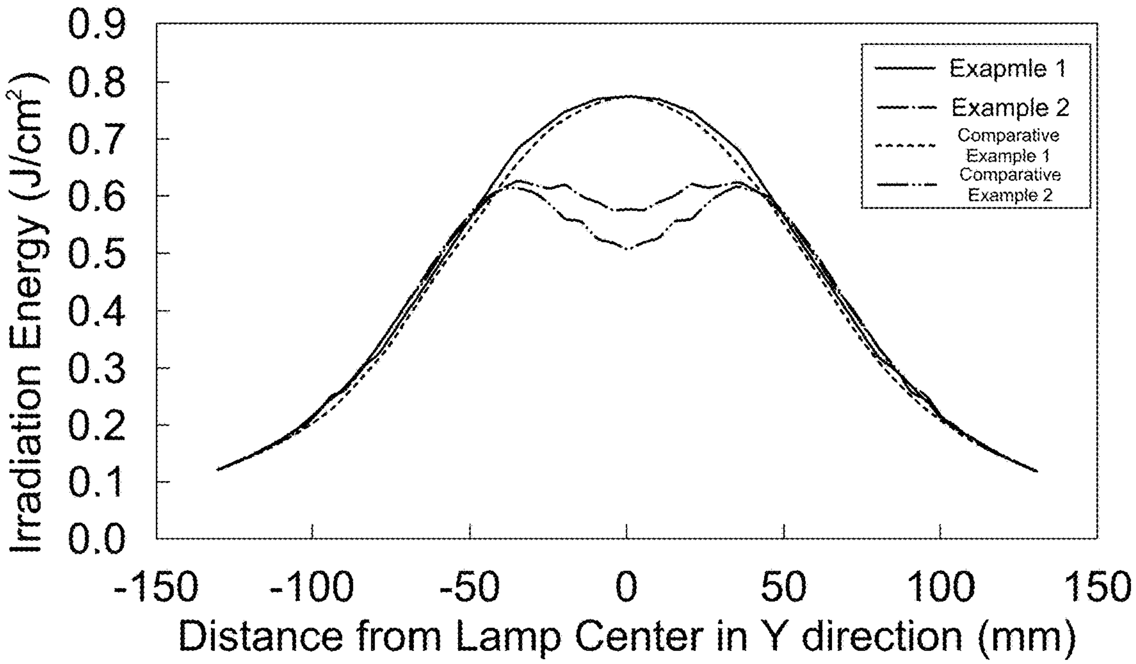
FIG. 5B is a graph showing a distribution of irradiation energy when a verification experiment in which one flash discharge lamp is mounted and a light-emitting tube and a calorimeter are distant 60 mm from each other is conducted.
Figure 5C:
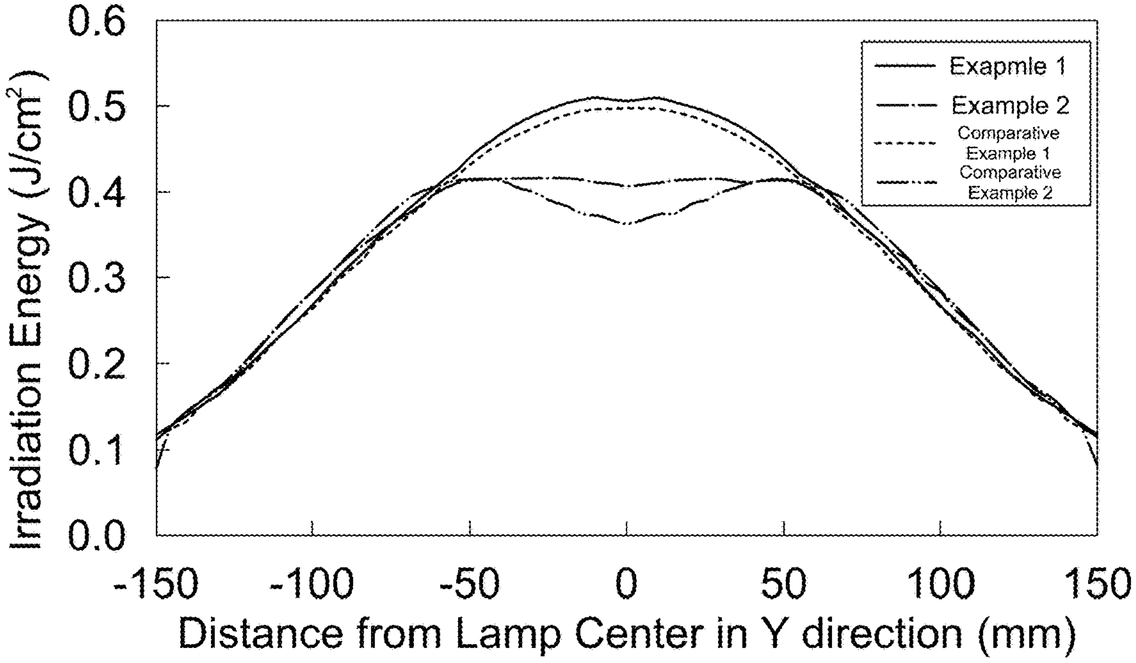
FIG. 5C is a graph showing a distribution of irradiation energy when a verification experiment in which one flash discharge lamp is mounted and a light-emitting tube and a calorimeter are distant 100 mm from each other is conducted.
Figure 6A:
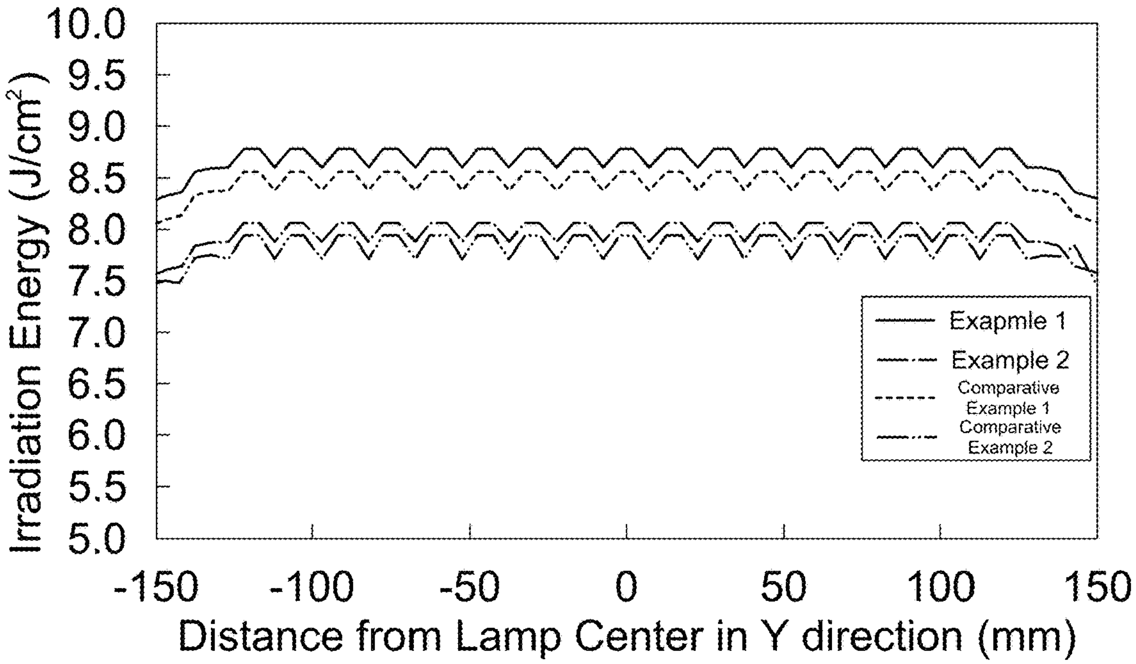
FIG. 6A is a graph showing a distribution of irradiation energy when a verification experiment in which 30 flash discharge lamps are mounted and a predetermined light-emitting tube and a calorimeter are distant 30 mm from each other is conducted.
Figure 6B:
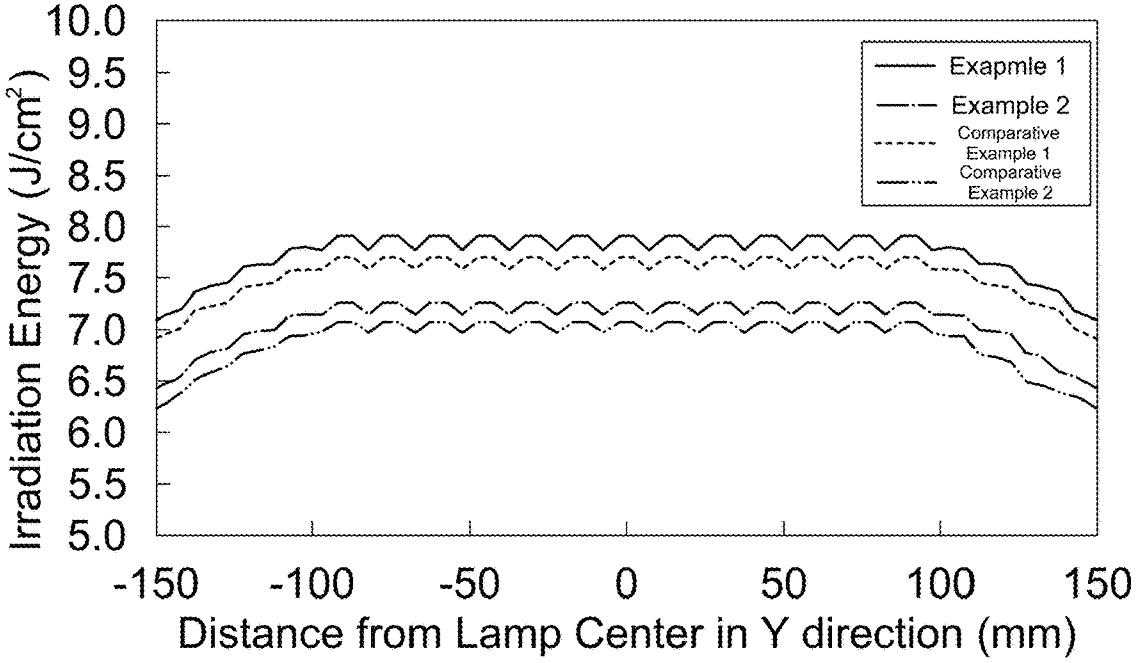
FIG. 6B is a graph showing a distribution of irradiation energy when a verification experiment in which 30 flash discharge lamps are mounted and a predetermined light-emitting tube and a calorimeter are distant 60 mm from each other is conducted.
Figure 6C:
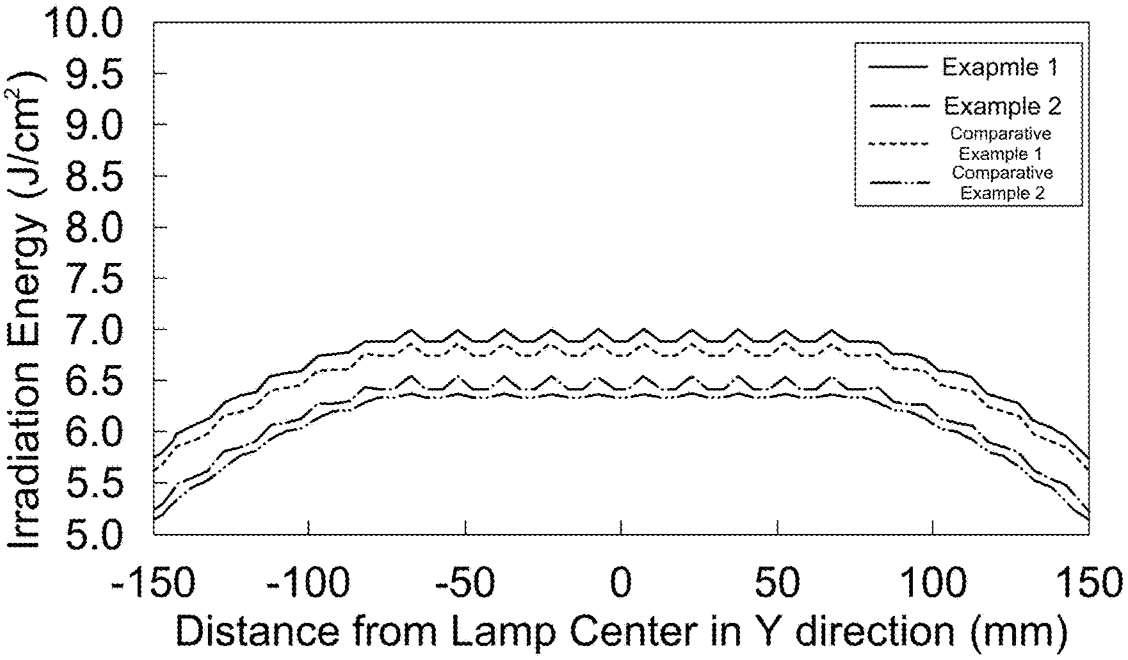
FIG. 6C is a graph showing a distribution of irradiation energy when a verification experiment in which 30 flash discharge lamps are mounted and a predetermined light-emitting tube and a calorimeter are distant 100 mm from each other is conducted.

FIGS. 5A to 5C are graphs each showing a distribution of irradiation energy in a case in which one flash discharge lamp 10 is mounted. FIGS. 6A to 6C are graphs each showing a distribution of irradiation energy in a case in which 30 flash discharge lamps 10 are mounted. As shown in FIGS. 5A to 5C, it is proved that when Example 1 and Comparative Example 1 are compared, Example 1 shows higher irradiation energy near a center of the lamp in particular. Similarly, it is proved that when Example 2 and Comparative Example 2 are compared, Example 2 shows higher irradiation energy near a center of the lamp in particular.

Furthermore, as shown in FIGS. 6A to 6C, it is proved that when Example 1 and Comparative Example 1 are compared, Example 1 shows higher irradiation energy almost throughout a range of 150 mm in particular in the Y direction. Similarly, it is proved that when Example 2 and Comparative Example 2 are compared, Example 2 shows higher irradiation energy near a center of the lamp in particular. Maximum irradiation energy values are as shown in Table 1 below.

TABLE 1

| Distance | Maximum Irradiation Energy Value (J/cm$^2$) | | | |
|---|---|---|---|---|
| from Lamp Center (mm) | Example 1 | Comparative Example 1 | Example 2 | Comparative Example 2 |
| 30 | 8.78 | 8.55 | 8.09 | 7.95 |
| 60 | 7.91 | 7.71 | 7.27 | 7.07 |
| 100 | 7.00 | 6.86 | 6.55 | 6.37 |

Consequently, in the flash irradiation device 1 configured as described above, the light L1 emitted from the light-emitting tube 11 is less apt to be blocked by the trigger electrodes (14*p*, 14*n*) and readily reaches the reflecting member 20 and the workpiece W1. As a result, the flash irradiation device 1 configured as described above suppresses a loss of energy of the light L1 emitted from the light-emitting tube 11 and is thus able to irradiate the workpiece W1 with the light L1 at an increased level of irradiation energy compared with the conventional flash irradiation device.

OTHER EMBODIMENTS

Other embodiments will now be described.

Figure 7:
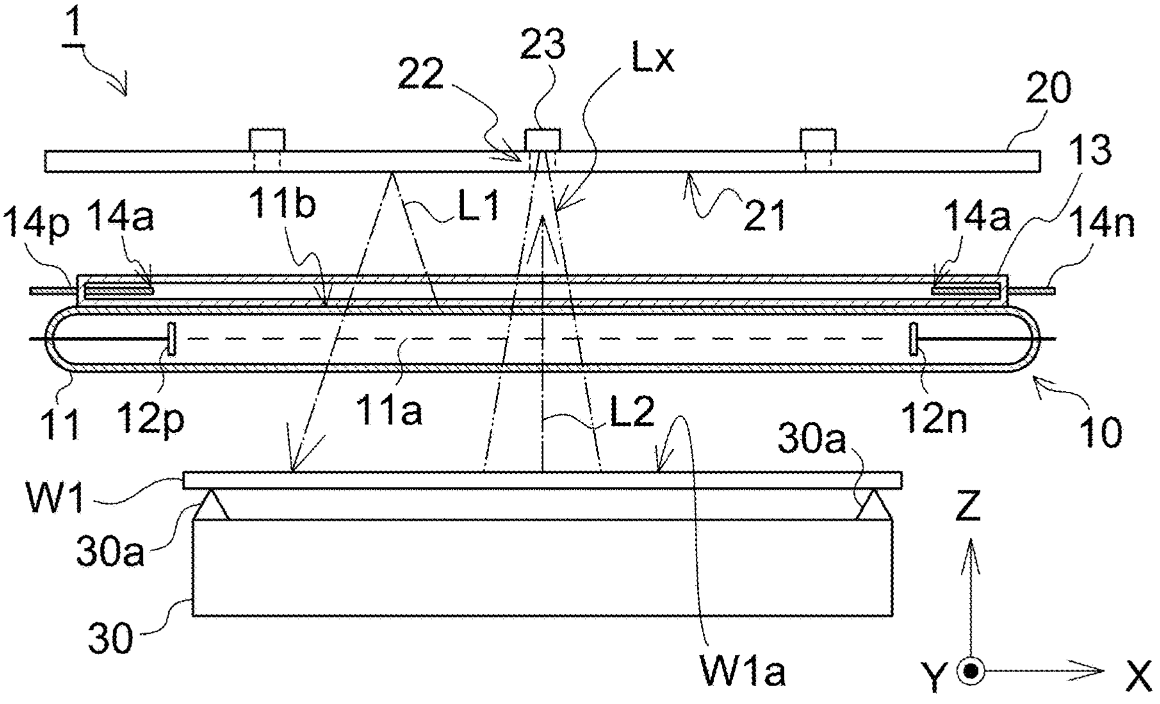
FIG. 7 is a schematic view of another embodiment of a flash irradiation device, viewed along the Y direction.

<1> FIG. 7 is a schematic view of another embodiment of a flash irradiation device 1, viewed along the Y direction. In the flash irradiation device 1, as shown in FIG. 7, respective ends (14*a*, 14*a*) of a pair of trigger electrodes (14*p*, 14*n*) may be disposed so as to be positioned outside a region put between a pair of discharging electrodes (12*p*, 12*n*) in the X direction. According to the configuration, light L1 is not blocked by the trigger electrodes (14*p*, 14*n*) in the Z direction in the region between the discharging electrodes (12*p*, 12*n*). This helps to increase irradiation energy of the light L1 radiated to a principal surface W1*a* of a workpiece W1.

Figure 8:
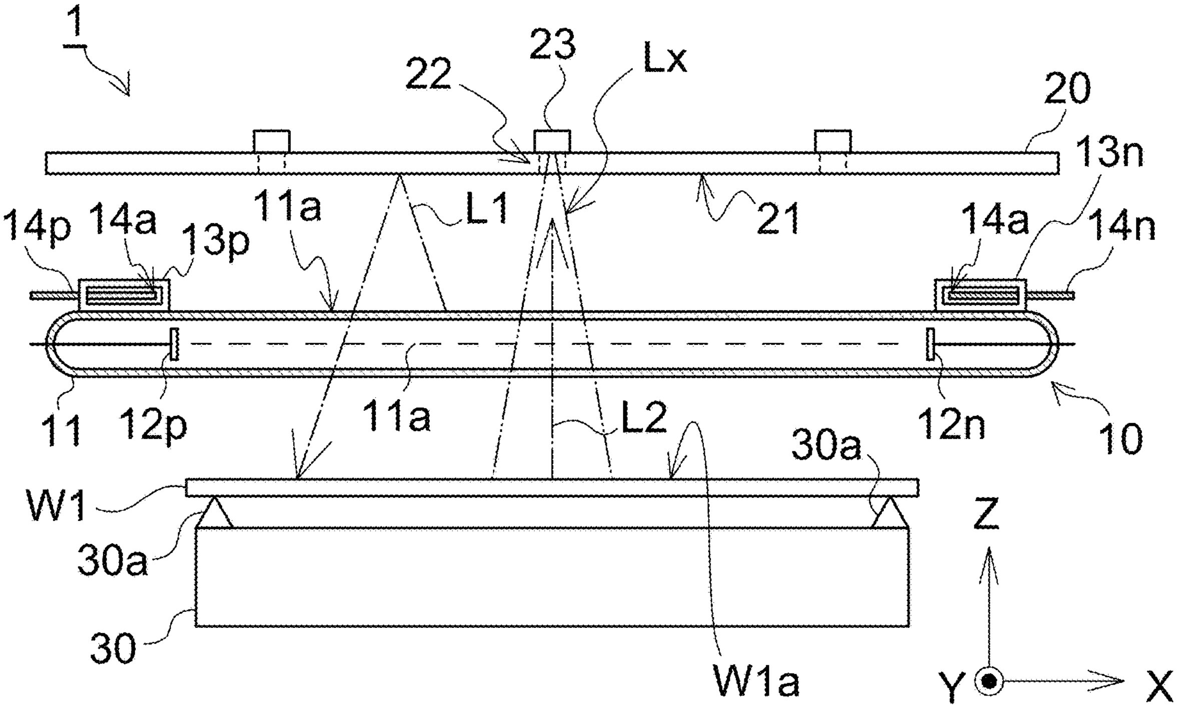
FIG. 8 is a schematic view of another embodiment of a flash irradiation device, viewed along the Y direction.

FIG. 8 is a schematic view of another embodiment of a flash irradiation device 1 different from the embodiment of FIG. 7, viewed along the Y direction. The flash irradiation device 1, as shown in FIG. 8, may include tubular bodies (13*p*, 13*n*) to seal respective ends (14*a*, 14*a*) of a pair of trigger electrodes (14*p*, 14*n*) inside. According to the configuration, an amount of light L1 traveling toward a reflecting member 20 and reaching a workpiece W1 without being transmitted through the tubular bodies (13*p*, 13*n*) increases. As a result, the flash irradiation device 1 having the configuration is able to irradiate the workpiece W1 with the light at an increased level of irradiation energy.

<2> The configurations of the flash irradiation device 1 and the flash discharge lamp 10 described above are merely examples, and the present invention is not limited to the illustrated configurations.

What is claimed is:

1. A flash irradiation device configured to irradiate a workpiece with light, the flash irradiation device comprising:

a light-emitting tube extending in a first direction and sealing a light-emitting gas inside;

a pair of discharging electrodes inside the light-emitting tube, the pair of the discharging electrodes being arranged distant from each other in the first direction;

a reflecting member that is disposed on an opposite side of the light-emitting tube from the workpiece such that light emitted from the light-emitting tube in a direction opposite the workpiece is reflected off the reflecting member toward the workpiece;

a pair of trigger electrodes on an outer wall surface of the light-emitting tube or in a vicinity of the light-emitting tube, the pair of the trigger electrodes being arranged distant from each other in the first direction;

a lighting circuit connected to the pair of the discharging electrodes, the lighting circuit being configured to supply electric power between the pair of the discharging electrodes; and a trigger circuit connected to the pair of the trigger electrodes, the trigger circuit configured to apply a voltage for starting lighting across the pair of the trigger electrodes.

2. The flash irradiation device according to claim 1, comprising a tubular body inside which a discharge gas including an element of group 18 is sealed and ends of the pair of the trigger electrodes facing each other in the first direction are sealed, the tubular body displaying transparency to light emitted from the light-emitting tube.

3. The flash irradiation device according to claim 2, wherein an encapsulated pressure of the discharge gas sealed in the tubular body is lower than atmospheric pressure.

4. The flash irradiation device according to claim 1, wherein respective ends of the pair of the trigger electrodes are positioned outside a region put between the pair of the discharging electrodes in the first direction.

5. The flash irradiation device according to claim 1, comprising:

an observation hole formed in the reflecting member to allow radiation radiated from the workpiece to pass through the observation hole; and a light-receiving element disposed on an opposite side of the reflecting member from the workpiece, the light-receiving element being configured to receive the radiation passing through the observation hole and output a signal based on intensity of the received radiation, wherein the observation hole and the light-receiving element are disposed between the pair of the trigger electrodes in the first direction.

6. The flash irradiation device according to claim 5, wherein the light-receiving element is an element such that a wavelength band in which the element displays light reception sensitivity belongs to a range less than or equal to 4 μm.

7. The flash irradiation device according to claim 1, wherein the trigger electrodes are disposed between the light-emitting tube and the reflecting member.

8. A flash discharge lamp comprising:

a light-emitting tube extending in a first direction and sealing a light-emitting gas inside;

a pair of discharging electrodes inside the light-emitting tube, the pair of the discharging electrodes being arranged distant from each other in the first direction; and a pair of trigger electrodes on an outer wall surface of the light-emitting tube or in a vicinity of the light-emitting tube, the pair of the trigger electrodes being arranged distant from each other in the first direction.

* * * * *